(12) United States Patent
Xu et al.

(10) Patent No.: US 12,244,070 B2
(45) Date of Patent: Mar. 4, 2025

(54) LOW-FREQUENCY VIBRATOR UNIT, ANTENNA COMPONENT, AND BASE STATION

(71) Applicant: Suzhou Luxshare Technology Co., Ltd., Suzhou (CN)

(72) Inventors: Wenkai Xu, Suzhou (CN); Chengyu Xu, Suzhou (CN); Zhenhua Li, Suzhou (CN); Hui Cao, Suzhou (CN)

(73) Assignee: SUZHOU LUXSHARE TECHNOLOGY CO., LTD., Suzhou (CN)

( * ) Notice: Subject to any disclaimer, the term of this patent is extended or adjusted under 35 U.S.C. 154(b) by 174 days.

(21) Appl. No.: 18/090,192

(22) Filed: Dec. 28, 2022

(65) Prior Publication Data

US 2024/0120665 A1 Apr. 11, 2024

(30) Foreign Application Priority Data

Oct. 9, 2022 (CN) .......................... 202211228127.X

(51) Int. Cl.
*H01Q 21/26* (2006.01)
*H01Q 1/24* (2006.01)
*H01Q 1/52* (2006.01)
*H01Q 3/02* (2006.01)
*H01Q 5/45* (2015.01)
*H01Q 9/28* (2006.01)
*H01Q 19/10* (2006.01)

(52) U.S. Cl.
CPC ............. *H01Q 21/26* (2013.01); *H01Q 1/246* (2013.01); *H01Q 1/521* (2013.01); *H01Q 3/02* (2013.01); *H01Q 5/45* (2015.01); *H01Q 9/285* (2013.01); *H01Q 19/108* (2013.01)

(58) Field of Classification Search
CPC .. H01Q 9/16; H01Q 9/26; H01Q 9/28; H01Q 9/285; H01Q 21/24; H01Q 21/26; H01Q 25/001
See application file for complete search history.

(56) References Cited

U.S. PATENT DOCUMENTS

| 2017/0264021 | A1* | 9/2017 | Heyde | H01Q 9/285 |
| 2020/0212598 | A1* | 7/2020 | Gonzalez | H01Q 21/30 |
| 2023/0170630 | A1* | 6/2023 | Du | H01Q 5/42 343/702 |

FOREIGN PATENT DOCUMENTS

| CN | 103682631 A | 3/2014 |
| CN | 111430885 B | 10/2020 |

(Continued)

*Primary Examiner* — Daniel Munoz
(74) *Attorney, Agent, or Firm* — Birch, Stewart, Kolasch & Birch, LLP

(57) ABSTRACT

The embodiments of the present disclosure disclose a low-frequency vibrator unit, an antenna component, and a base station. A vibrator arm is provided to bend towards the bottom, and a director is provided with a window corresponding to an extension branch. Therefore, in an aspect, the vibrator arm occupies less space, such that more low-frequency vibrator units may be arranged in the same space. In another aspect, the window provided in the director reduces influences thereof on a high-frequency vibrator unit below and improves a cross-polarization ratio of the antenna component, such that signal space directivity of the antenna component is stronger. In yet another aspect, the antenna component occupies less space in the base station.

12 Claims, 8 Drawing Sheets

(56) References Cited

FOREIGN PATENT DOCUMENTS

| | | |
|---|---|---|
| CN | 212412195 U | 1/2021 |
| CN | 113131197 A | 7/2021 |
| CN | 213753054 U | 7/2021 |
| CN | 113675601 A | 11/2021 |
| CN | 113764870 A | 12/2021 |
| CN | 216288941 U | 4/2022 |
| CN | 217934192 U | 11/2022 |
| TW | 201448353 A | 12/2014 |

* cited by examiner

LOW-FREQUENCY VIBRATOR UNIT, ANTENNA COMPONENT, AND BASE STATION

CLAIM OF PRIORITY AND CROSS-REFERENCE TO RELATED APPLICATION(S)

This application claims the benefit of Chinese Patent Application No. 202211228127.X, filed on Oct. 9, 2022, which is incorporated herein by reference in its entirety.

BACKGROUND OF THE INVENTION

1. Field of the Invention

The present disclosure relates to the field of antennas, and in particular, to a low-frequency vibrator unit, an antenna component, and a base station.

2. Description of the Related Art

With continuous development of mobile communication technologies, people are increasingly dependent on these technologies in their lives. As an important part of mobile communication, base station antennas may have important impacts on the mobile communication technologies in indicators such as arranged number, position, and strength of signal transceiving capability. How to improve signal transceiving performance of the antenna is a problem needs to be solved.

BRIEF DESCRIPTION OF THE INVENTION

In view of this, the embodiments of the present disclosure provide a low-frequency vibrator unit, an antenna component, and a base station, and improve transceiving performance of the low-frequency vibrator unit by using vibrator arms bending towards the bottom of the low-frequency vibrator unit and a director having a window.

According to a first aspect of an embodiment of the present disclosure, there is provided a low-frequency vibrator unit, including:

- a plurality of vibrator arms including extension branches and bending branches, where the extension branch is oriented towards a peripheral side of the low-frequency vibrator unit, and the bending branch is oriented towards the bottom of the low-frequency vibrator unit; and
- a director provided at the top of the low-frequency vibrator unit and having intervals with the plurality of the vibrator arms, where the director has a window, and at least part of the window corresponds to an orientation of each extension branch.

Further, the director further has a directional pattern provided along an edge of the window.

Further, the window includes a plurality of rectangular windows, and each rectangular window is provided in a length direction of each extension branch; and the directional pattern includes a plurality of directional branches, and each directional branch corresponds to each edge of the rectangular window.

Further, the window further includes a center window in communication with the plurality of rectangular windows; and the two directional branches on opposite sides of the two adjacent rectangular windows are connected to each other, and the total length of the plurality of directional branches is 0.8 $\lambda 1$ to 1.2 $\lambda 1$, where the $\lambda 1$ is a wavelength of a center frequency point of a working frequency band of the low-frequency vibrator unit.

Further, the plurality of rectangular windows are four rectangular windows with the same orientation, and the two adjacent rectangular windows are vertically arranged to each other; and the plurality of directional branches include a plurality of first directional branches and a plurality of second directional branches, the first directional branch is located on opposite sides of the two adjacent rectangular windows, and the second directional branch is located between the two first directional branch, where a length of the first directional branch is 0.1 $\lambda 1$, and a length of the second directional branch is 0.05 $\lambda 1$.

Further, the extension branch includes a first rectangular pattern, a second rectangular pattern, and a third rectangular pattern which are connected sequentially; and the bending branch includes a fourth rectangular pattern and a fifth rectangular pattern which are connected sequentially, where the fourth rectangular pattern is connected to the third rectangular pattern, and arrangement directions of the fourth rectangular pattern and the fifth rectangular pattern are vertical to an extension direction of the extension branch.

Further, a distance between edges of opposite sides of the first rectangular pattern and the third rectangular pattern is 0.05 $\lambda 2$, a length of a side edge of the third rectangular pattern parallel to the extension direction of the extension branch 0.13 $\lambda 2$, and a length of a side edge vertical to the extension direction of the extension branch of the third rectangular pattern is 0.08 $\lambda 2$, where the $\lambda 2$ is a wavelength of a center frequency point of a working frequency band of a high-frequency vibrator unit.

Further, the third rectangular pattern has a foot point, and the first rectangular pattern, the second rectangular pattern, the fourth rectangular pattern, and the fifth rectangular pattern are arranged along the foot point respectively;

a first distance is from the foot point to an edge of the first rectangular pattern far from the third rectangular pattern, and a second distance is from the foot point to an edge of the fifth rectangular pattern far from the fourth rectangular pattern; and the total length of the first distance and the second distance is 0.25 $\lambda 1$, wherein the $\lambda 1$ is a wavelength of a center frequency point of a working frequency band of the low-frequency vibrator unit.

Further, the first rectangular pattern is provided with a connecting hole; and/or the third rectangular pattern is provided with a rectangular hole located at a position close to the second rectangular pattern.

Further, the low-frequency vibrator unit further includes:

- a balun component including a plurality of baluns, where two vibrator arms are mounted on two sides of the same balun; and
- a base provided with a plurality of mounting grooves and feeding circuits, where the balun component is mounted at the base by means of the mounting groove and is electrically connected to the feeding circuits.

According to a second aspect, an embodiment of the present disclosure further provides an antenna component including:

- a plurality of high-frequency vibrator units;
- the low-frequency vibrator unit according to the above first aspect; and a reflection plate mounted with the high-frequency vibrator unit and the low-frequency vibrator unit at intervals.

According to a third aspect, an embodiment of the present disclosure further provides a base station including:

the antenna component according to the above second aspect.

According to the embodiments of the present disclosure, there is provided a low-frequency vibrator unit, an antenna component, and a base station. A vibrator arm is provided to bend towards the bottom, and a director is provided with a window corresponding to an extension branch. Therefore, in an aspect, the vibrator arm occupies less space, such that more low-frequency vibrator units may be arranged in the same space. In another aspect, the window provided in the director reduces influences thereof on a high-frequency vibrator unit below and improves a cross-polarization ratio of the antenna component, such that signal space directivity of the antenna component is stronger. In yet another aspect, the antenna component occupies less space in the base station,

BRIEF DESCRIPTION OF THE DRAWINGS

The foregoing and other objects, features and advantages of the present disclosure will become more apparent from the following description of embodiments of the present disclosure with reference to the accompanying drawings, in which.

DETAILED DESCRIPTION OF EMBODIMENTS OF THE INVENTION

The present disclosure is described below based on the embodiments, but the present disclosure is not limited thereto. In the following detailed description of the present disclosure, certain specific details are described in detail. The present disclosure may be fully understood by those skilled in the art without the description of these detailed parts. In order to avoid confusing the substance of the present disclosure, well-known methods, processes, flows, elements and circuits have not been described in detail.

In addition, it should be understood by those of ordinary skill in the art that the drawings provided herein are for illustrative purposes, and the drawings are not necessarily drawn to scale.

Unless the context clearly requires otherwise, similar words such as "including" and "containing" throughout the application document should be interpreted as inclusive rather than exclusive or exhaustive; that is to say, it means "including but not limited to".

In the description of the disclosure, it should be understood that the terms "first" and "second" are only used for descriptive purposes, and cannot be understood as indicating or implying relative importance. In addition, in the description of the disclosure, unless otherwise stated, "plurality" means two or more.

For ease of description, the spatially relative terms such as "in", "out", "under", "below", "lower", "above", "upper", etc., are used to describe a relationship between one element or feature and another element or feature shown in the figures herein. It would be understood that the spatially relative terms desire to include different orientations in addition to orientations described in the figures when a device is used or operated. For example, if the device in the figures is flipped, it is described that elements "below" or "under" other elements or features are positioned to be "above" other elements or features. Therefore, exemplary terms "below" may include both orientations of "above" and "below". The device may be oriented in other manners (rotated 90 degrees or at other orientations) and the spatially relative descriptors used herein may be interpreted accordingly.

Figure 1:
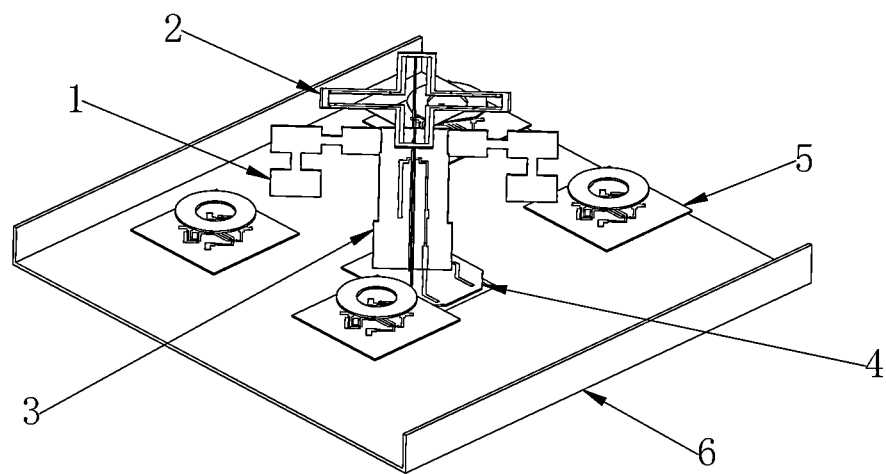
FIG. 1 is a schematic structural diagram of an antenna component according to an embodiment of the present disclosure.

FIG. 1 is a schematic structural diagram of an antenna component according to an embodiment of the present disclosure. The antenna component in the figure includes four high-frequency vibrator units 5 and one low-frequency vibrator unit, where the low-frequency vibrator unit is provided at a middle position among the four high-frequency vibrator units 5. The above five vibrator units are all mounted on one reflection plate 6.

Figure 2:
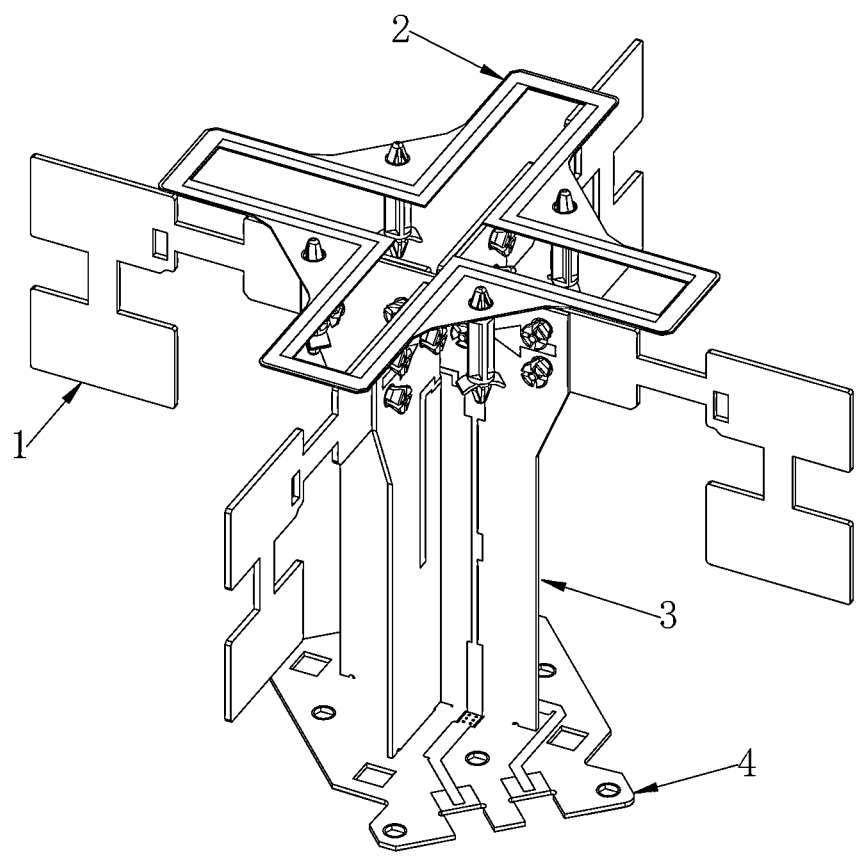
FIG. 2 is a schematic structural diagram of a low-frequency vibrator unit according to an embodiment of the present disclosure.
Figure 3:
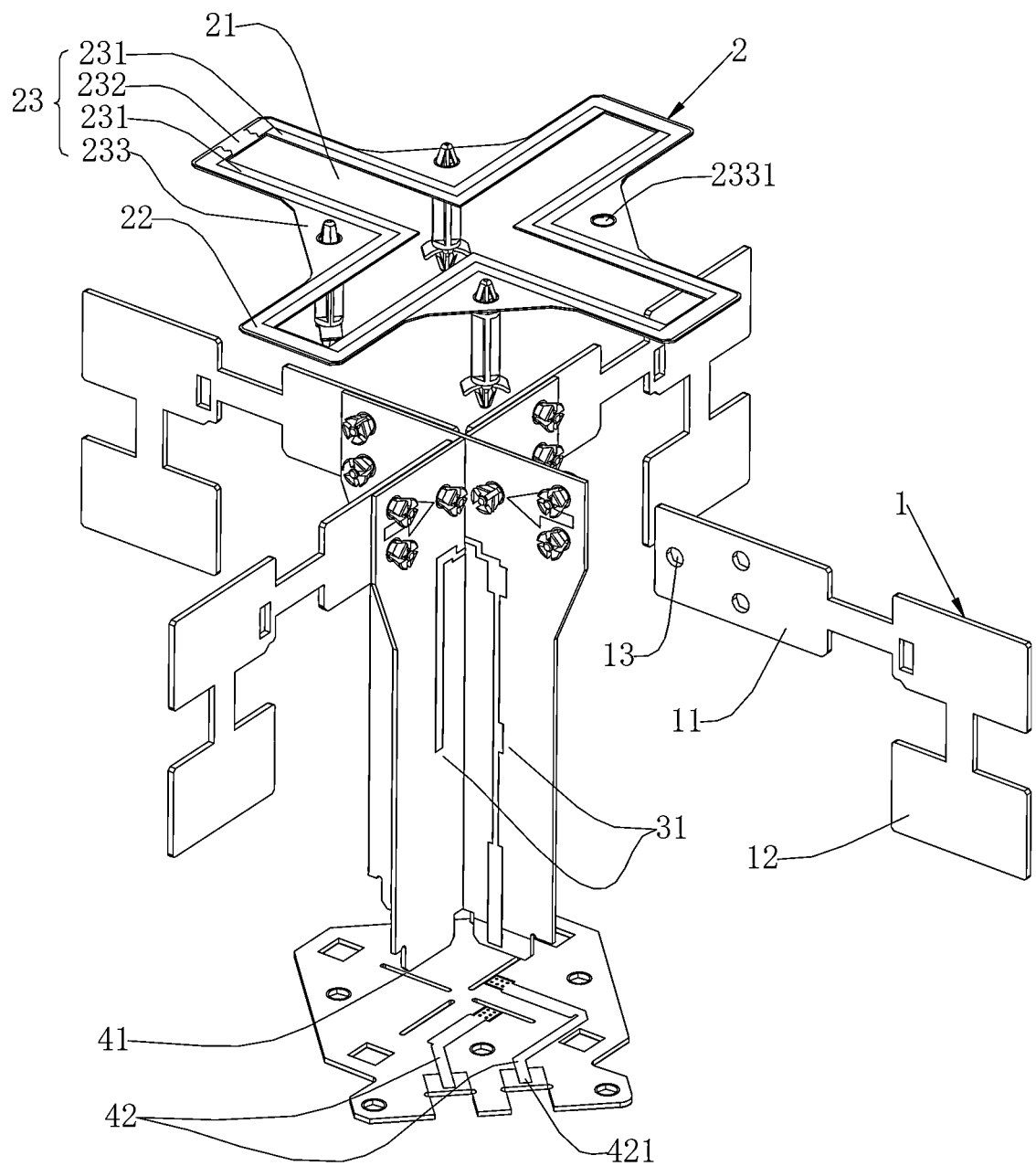
FIG. 3 is a schematic exploded diagram of a low-frequency vibrator unit according to an embodiment of the present disclosure.

FIGS. 2 and 3 respectively are structural schematic diagrams and schematic exploded diagrams of a low-frequency vibrator unit according to an embodiment of the present disclosure. A director 2 in the figure is located at the top of the low-frequency vibrator unit, a vibrator arm 1 is located at a lower part of the director 2 and is connected to a base 4 by means of a balun component 3, such that the low-frequency vibrator unit may keep a vertical state or is fixed on a reflection plate 6 on the antenna component by means of the base 4.

In some implementations, as shown in FIGS. 1 to 3, the low-frequency vibrator unit includes a plurality of vibrator arms 1 and the director 2, where the vibrator arm 1 includes an extension branch 11 and a bending branch 12, and the extension branch 11 is oriented towards a peripheral side of the low-frequency vibrator unit, and the bending branch 12 is oriented towards the bottom of the low-frequency vibrator unit. The director 2 is provided at the top of the low-frequency vibrator unit and has intervals with the plurality of vibrator arms 1, the director 2 has a window 21, and at least part of the window 21 corresponds to an orientation of each extension branch 11.

According to the low-frequency vibrator unit in this embodiment, the vibrator arm 1 is provided to bend towards the bottom, and the director 2 is provided with the window 21 corresponding to the extension branch 11. Therefore, the vibrator arm 1 occupies less space, such that more low-frequency vibrator units may be arranged in the same space. In another aspect, the window 21 provided on the director 2 reduces mutual influences on each other when the low-frequency vibrator unit and the high-frequency vibrator unit 5 are arrayed.

It is easy to understand that in this embodiment, to reduce the space occupied by the low-frequency vibrator unit, the vibrator arm 1 bends towards the bottom of the low-frequency vibrator unit. The bending branch 12 of the bended vibrator arm 1 may be more close to the high-frequency vibrator unit 5, such that the high-frequency vibrator unit 5 and the low-frequency vibrator unit may influence each other to a certain degree. Therefore, the window 21 of the director 2 may reduce interference between the high-frequency vibrator unit 5 and the low-frequency vibrator unit.

FIGS. 4 to 6 and FIGS. 7 to 10 respectively are schematic diagrams of different structural forms of a director 2 and a vibrator arm 1. In some implementations, as shown in FIGS. 1 to 5 and FIG. 7, the director 2 further has a directional pattern 22 provided along an edge of a window 21. In this embodiment, to further reduce influences of the director 2 on a high-frequency vibrator unit 5, in a case of a size of the director 2 remaining unchanged, an area of the window 21 is increased, such that the directional pattern 22 is provided around the edge of the window 21.

Specifically, the director 2 of this embodiment further includes a substrate, the directional pattern 22 in the above embodiment is formed on one side, deviating from the vibrator arm 1, on the substrate, and the window 21 penetrates through the substrate. A material of the substrate may be a epoxy resin (RF4) plate. Correspondingly, the vibrator arm 1 is also in a plate structure, and the top of a plate edge position thereof is oriented towards the bottom of the substrate. Therefore, an electromagnetic signal is guided by means of the directional pattern 22, and interference on the high-frequency vibrator unit 5 may be reduced at the same time.

In some implementations, as shown in FIGS. 1 to 5 and FIG. 7, the window 21 includes a plurality of rectangular windows 211, and each rectangular window 211 is provided in a length direction of each extension branch 11. The directional pattern 22 includes a plurality of directional branches 221, and each directional branch 221 corresponds to each edge of the rectangular window 211.

Specifically, the substrate in the above embodiment includes a plurality of component units 23, and each component unit 23 corresponds to the above rectangular window 211 and vibrator arm 1 one by one. Each component unit 23 extends towards the length direction of the extension branch 11. The rectangular window 211 is provided at a central region of the component unit 23, and the component unit 23 has two first frames 231 parallel to the length direction of the extension branch 11 and is connected to second frames 232 of the two first frames 231. The plurality of directional branches 221 in this embodiment twine round the first frame 231 and the second frame 232, thereby utilizing the area on the substrate to the maximum, to meet demands of the directional branches 221 on length.

It is easy to understand that the first frame 231 and the second frame 232 on the director 2 has been provided with the directional pattern 22, such that the position is relatively limited. To fix the director 2, a connecting plate 233 may be provided between two adjacent component units 23, and is configured to fix the position of the director 2. FIG. 2 shows a connecting plate 233 in which a fixing hole 2331 for fixing is provided at the central position. The fixing hole 2331 may be fixedly connected to a base 4 by means of a support structure (which is not shown in the figure).

In some implementations, as shown in FIGS. 1 to 5 and FIG. 7, the window 21 further includes a center window 212 in communication with the plurality of rectangular windows 211. Two directional branches 221 on opposite sides of two adjacent rectangular windows 211 are connected to each other, and the total length of the plurality of directional branches 221 is 0.8 λ1 to 1.2 λ1, where λ1 is a wavelength of a center frequency point of a working frequency band of a low-frequency vibrator unit.

Preferably, the total length of the directional branches 221 is the same as the wavelength of the center frequency point of the working frequency band of the low-frequency vibrator unit. Electromagnetic energy may be coupled to a metallic body and conducts in an arrangement direction of the metallic body. Configuring the length of the directional branches 221 to be the same as the wavelength of the center frequency point of the working frequency band of the low-frequency vibrator unit may facilitate coupling an electromagnetic wave sent by the vibrator arm 1.

In some implementations, as shown in FIGS. 1 to 5 and FIG. 7, the plurality of rectangular windows 211 are four rectangular windows 211 with the same orientation, and the two adjacent rectangular windows are vertically arranged to each other. The plurality of directional branches 221 include a plurality of first directional branch 2211 and a plurality of second directional branch 2212, the first directional branch 2211 is located on opposite side of the two adjacent rectangular windows 211, and the second directional branch 2212 is located between two first directional branches 2211 and is provided at an end portion of the first directional branch 2211, where a length of the first directional branch 2211 is 0.1 λ1, and a length of the second directional branch 2212 is 0.05 λ1. The first directional branch 2211 in this embodiment corresponds to the first frame 231 in the above embodiment, and the second directional branch 2212 corresponds to the second frame. The length and the width are configured in this embodiment, which enables the director 2 not only to ensure a good conduction effect on the electromagnetic wave radiated by the vibrator arm 1, but also reduce interference on the high-frequency vibrator unit 5.

Figure 5:
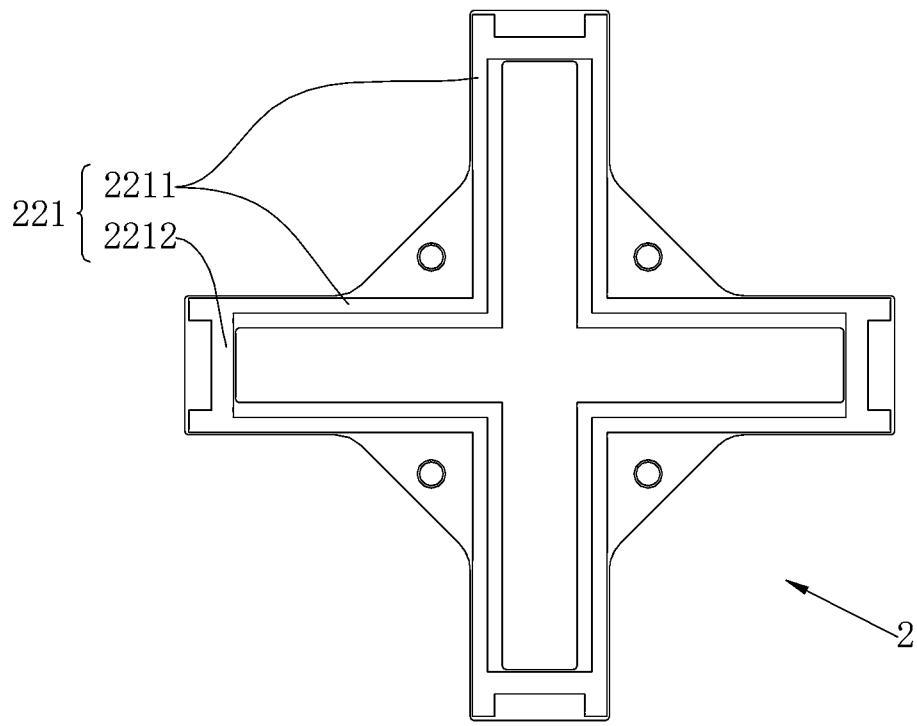
FIG. 5 is a schematic structural diagram of a director in other implementations according to an embodiment of the present disclosure.

Optionally, FIG. 5 shows a connecting form of the first directional branch 2211 and the second directional branch 2212, and the second directional branch 2212 is located at a position close to the end portion of the first directional branch 2211, that is, the second directional branch 2212 keeps a certain distance from the end portion of the first directional branch 2211, thereby increasing the total length of the plurality of directional branches 221.

Figure 6:
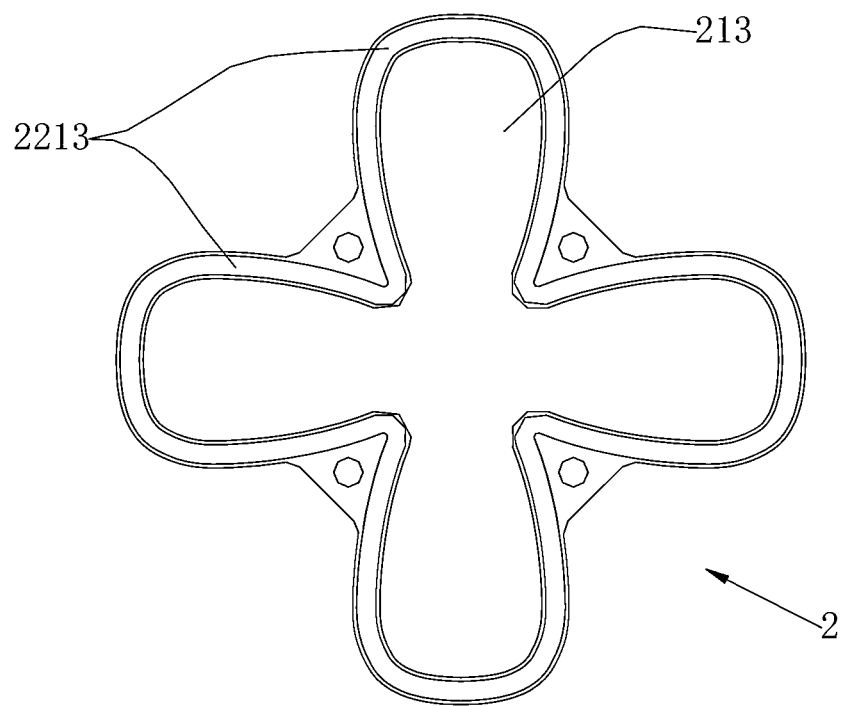
FIG. 6 is a schematic structural diagram of a director in some other implementations according to an embodiment of the present disclosure.

Optionally, FIG. 6 shows another form. The directional pattern 22 in the figure is composed of a plurality of third directional branches 2213. Each third directional branch 2213 extends from the central region of the director 2 to an outer side and circles back to the central region after bending in a flap-shaped structure. Correspondingly, a shape of the window 21 is a flap-shaped window 213 correspondingly. At the same time, the flap-shaped structure includes an outer section, a middle section, and an inner section sequentially, from an outer side to an inner side. The inner section has a small width, and adjacent flap-shaped structures are connected to each other by means of this part. A width of the outer section of the flap-shaped structure is larger than that of the inner section, and a width of the middle section of the flap-shaped structure is larger than that of the outer section. At the same time, the above connecting plate 233 is located at the inner section. The directional pattern 22 in this embodiment should still enable the total length of the plurality of third directional branches 2213 to be the same as the wavelength of the center frequency point of the working frequency band of the low-frequency vibrator unit, and enable the director 2 to be more beautiful.

In some implementations, as shown in FIGS. 1 to 5 and FIG. 7, the extension branch 11 includes a first rectangular pattern 111, a second rectangular pattern 112, and a third rectangular pattern 113 that are connected sequentially. The bending branch 12 includes a fourth rectangular pattern 121 and a fifth rectangular pattern 122 that are connected sequentially. The fourth rectangular pattern 121 is connected to the third rectangular pattern 113, and arrangement directions of the fourth rectangular pattern 121 and the fifth rectangular pattern 122 are vertical or relatively vertical to the extension direction of the extension branch 11.

In other implementations, the arrangement directions of the fourth rectangular pattern 121 and the fifth rectangular pattern 122 and the extension direction of the extension branch 11 may be configured to be at 120°, and a region may be formed between the extension branch 11 and the bending branch 12 at this time which may be used to provide the high-frequency vibrator unit 5, thereby further improving space utilization of the antenna component.

Figure 4:
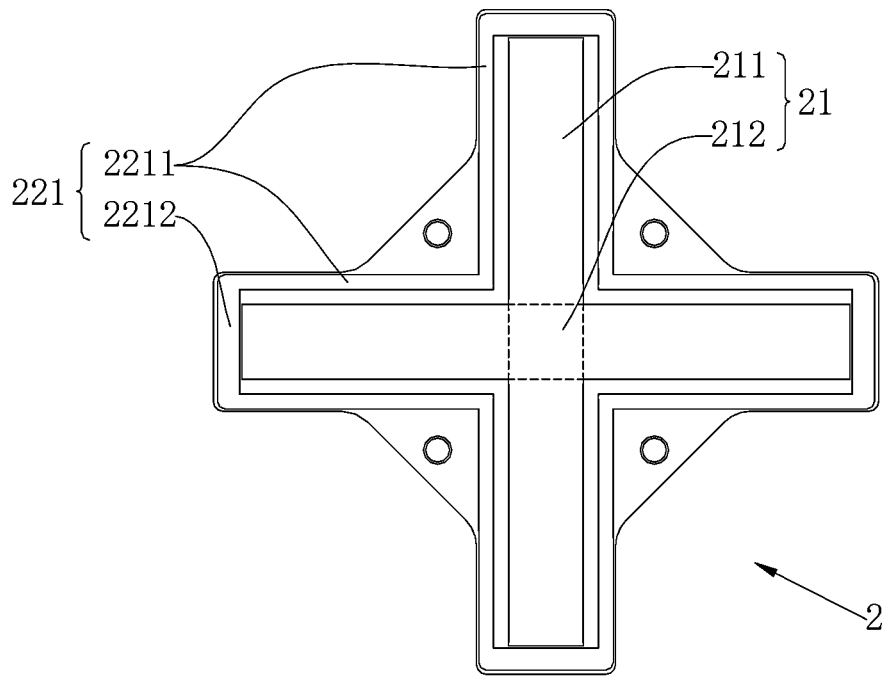
FIG. 4 is a schematic structural diagram of a director in some implementations according to an embodiment of the present disclosure.

In some implementations, as shown in FIGS. 1 to 5 and FIG. 7, a distance between edges of opposite sides of the first rectangular pattern 111 and the third rectangular pattern 113 is 0.05 $\lambda 2$, a length of a side edge of the third rectangular pattern 113 parallel to the extension direction of the extension branch 11 is 0.13 $\lambda 2$, and a length of a side edge which is vertical to the extension direction of the extension branch 11 of the third rectangular pattern 113 is 0.08 $\lambda 2$, where $\lambda 2$ is a wavelength of a center frequency point of a working frequency band of the high-frequency vibrator unit 5. FIG. 4 shows a size corresponding to this embodiment, where L1 is 0.05 $\lambda 2$, L2 is 0.13 $\lambda 2$, and L3 is 0.08 $\lambda 2$ at the same time. A size of the extension branch 11 of this embodiment is related to the wavelength of the center frequency point of the working frequency band of the high-frequency vibrator unit 5, and the size of the extension branch 11 is configured, such that an antenna component with an array composed of the high-frequency vibrator unit 5 and the high-frequency vibrator unit 5 has more excellent performance.

In some implementations, as shown in FIGS. 1 to 5 and FIG. 7, the third rectangular pattern 113 has a foot point 1131, and the first rectangular pattern 111 and the second rectangular pattern 112 and the fourth rectangular pattern 121 and the fifth rectangular pattern 122 are arranged along the foot point 1131. A first distance is from the foot point 1131 to an edge of the first rectangular pattern 111 far from the third rectangular pattern 113, and a second distance is from the foot point 1131 to an edge of the fifth rectangular pattern 122 far from the fourth rectangular pattern 121. The total length of the first distance and the second distance is 0.25 $\lambda 1$, where $\lambda 1$ is a wavelength of a center frequency point of a working frequency band of the low-frequency vibrator unit. The total length of the first distance and the second distance in this embodiment is also the total length of dashed lines in FIG. 7. A dashed line in a horizontal direction is the first distance, and a dashed line in a vertical direction is the second distance. A length of the vibrator arm 1 is configured to one fourth of the wavelength of the center frequency point of the working frequency band of the low-frequency vibrator unit, such that the vibrator arm 1 is easy to radiate electromagnetic waves out.

Optionally, the first rectangular pattern 111 is provided with a connecting hole 13. The third rectangular pattern 113 is provided with a rectangular hole 14 located at a position close to the second rectangular pattern 112 and a corner cut 15. The corner cut 15 is located at an opposite side of the second rectangular pattern 112 and the fourth rectangular pattern 121, and the first rectangular pattern 111 has another corner cut 15 located at a position opposite to the corner cut 15 of the third rectangular pattern 113.

Figure 7:
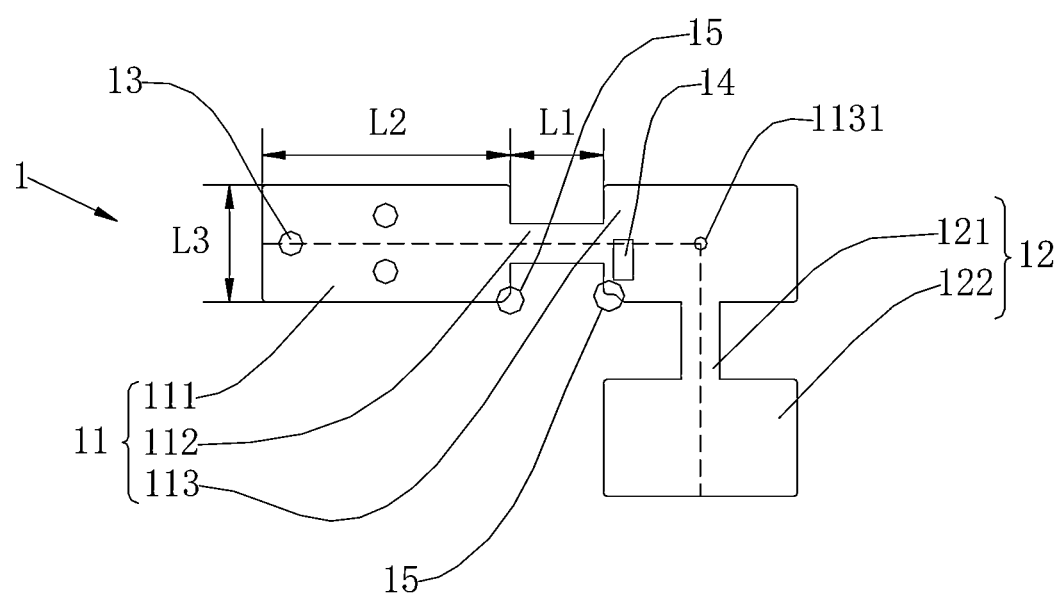
FIG. 7 is a schematic structural diagram of a vibrator arm in some implementations according to an embodiment of the present disclosure.

In other words, the size of the vibrator arm 1 shown in FIG. 7 and sizes of L1, L2, and L3 consider a working frequency of the high-frequency vibrator unit 5, and on the premise of this, the size shown by the dashed lines further consider a working frequency of the low-frequency vibrator unit. That is, sizes of the first rectangular pattern 111, the second rectangular pattern 112, the third rectangular pattern, the fourth rectangular pattern 121, and the fifth rectangular pattern 122 are configured, such that a matrix composed of the low-frequency vibrator unit and the high-frequency vibrator unit 5 has a higher cross-polarization ratio.

Figure 8:
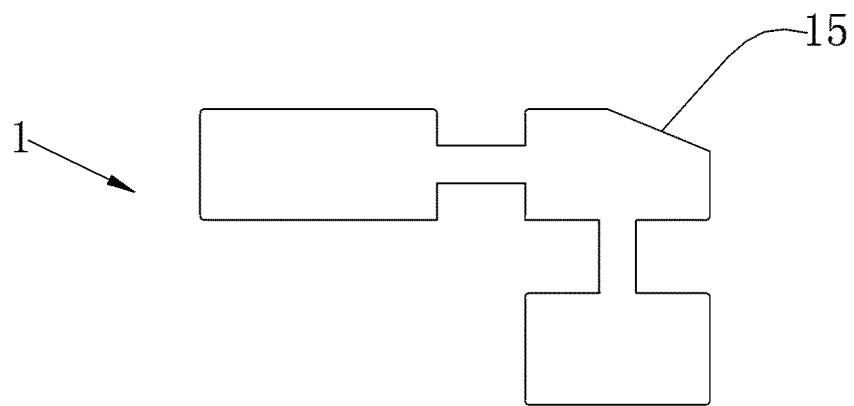
FIG. 8 is a schematic structural diagram of a vibrator arm in other implementations according to an embodiment of the present disclosure.
Figure 9:
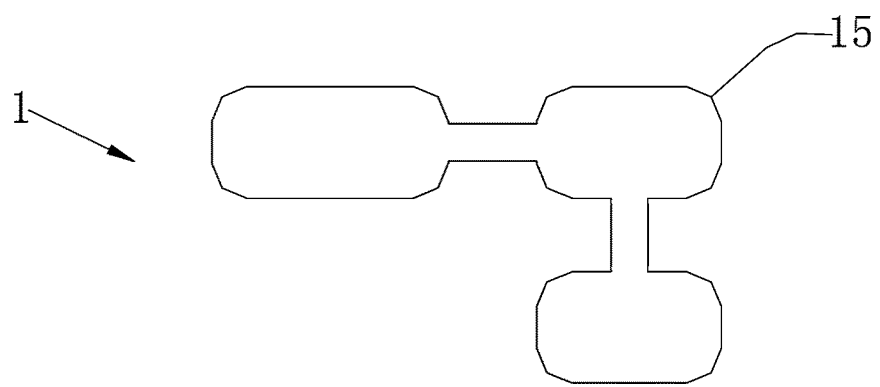
FIG. 9 is a schematic structural diagram of a vibrator arm in some other implementations according to an embodiment of the present disclosure.
Figure 10:
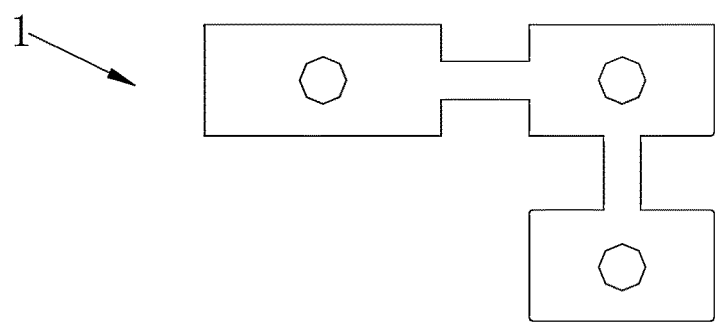
FIG. 10 is a schematic structural diagram of a vibrator arm in yet other implementations according to an embodiment of the present disclosure.

FIGS. 8 to 10 are schematic structural diagrams of a vibrator arm 1 in other implementations. In other implementations, a corner cut 15 of the vibrator arm 1 may have a plurality of forms. For example, in FIG. 8, the corner cut 15 is located at a top right corner of the third rectangular pattern 113, and an edge of the corner cut 15 is a straight line and has a relatively large cutting area. For another example, corner cuts 15 in the FIG. 9 are respectively located at four top corners of the first rectangular pattern 111, the third rectangular pattern 113, and the fifth rectangular pattern 122 and the corner cuts 15 are round corners. In FIG. 10, there is no corner cut 15, however, round holes are respectively provided at center positions of the first rectangular pattern 111, the third rectangular pattern 113, and the fifth rectangular pattern 122.

In some implementations, as shown in FIGS. 1 to 3, the low-frequency vibrator unit further includes a balun component 3 and a base 4. The balun component 3 includes a plurality of baluns 31, and two vibrator arms 1 are provided on two sides of the same balun 31. The base 4 is provided with a plurality of mounting grooves 41 and feeding circuits 42, and the balun component 3 is mounted on the base 4 by means of the mounting groove 41 and is electrically connected to the feeding circuits 42.

Balun 31 is also referred to as a balanced and unbalanced impedance transformer. It may perform impedance transforming of ratios such as 1:1, 4:1, 6:1, 9:1, and 25:1. The principle is according to an antenna theory. A dipole antenna belongs to a balanced antenna, and a coaxial cable belongs to an unbalanced transmission line, and if the dipole antenna is directly connected to the coaxial cable, high-frequency current flows through the sheath of the coaxial cable, thereby influencing radiation of the antenna. Therefore, the balanced and unbalanced transformer is added between the antenna and the cable. The balun component 3 shown in FIG. 3 includes two baluns 31 provided crisscross. Correspondingly, the base 4 is provided with two feeding circuits 42 configured to feed the two baluns 31 when the baluns 31 are inserted to the base 4. Two ports 421 are provided at an edge of the base 4, and the two ports 421 are configured to be electrically connected to the coaxial cable.

In an optional implementation, a plurality of low-frequency vibrator units in the above embodiment are applied to the antenna component. The antenna component further includes a plurality of high-frequency vibrator units 5 and reflection plates 6. The low-frequency vibrator unit and the high-frequency vibrator unit 5 are mounted on the reflection plate and provided at intervals.

According to the antenna component in this embodiment, the vibrator arm 1 of the low-frequency vibrator unit is provided to bend towards the bottom, and the director 2 is provided with the window 21 corresponding to the extension branch 11 at the same time. Therefore, in an aspect, the low-frequency vibrator unit occupies less space, such that more low-frequency vibrator units may be arranged in the same space. In another aspect, the window 21 provided in the director 2 reduces influences thereof on the high-frequency vibrator unit 5 below and improves a cross-polarization ratio of the antenna component, such that signal space directivity and decoupling of the antenna component is stronger.

Figure 11:
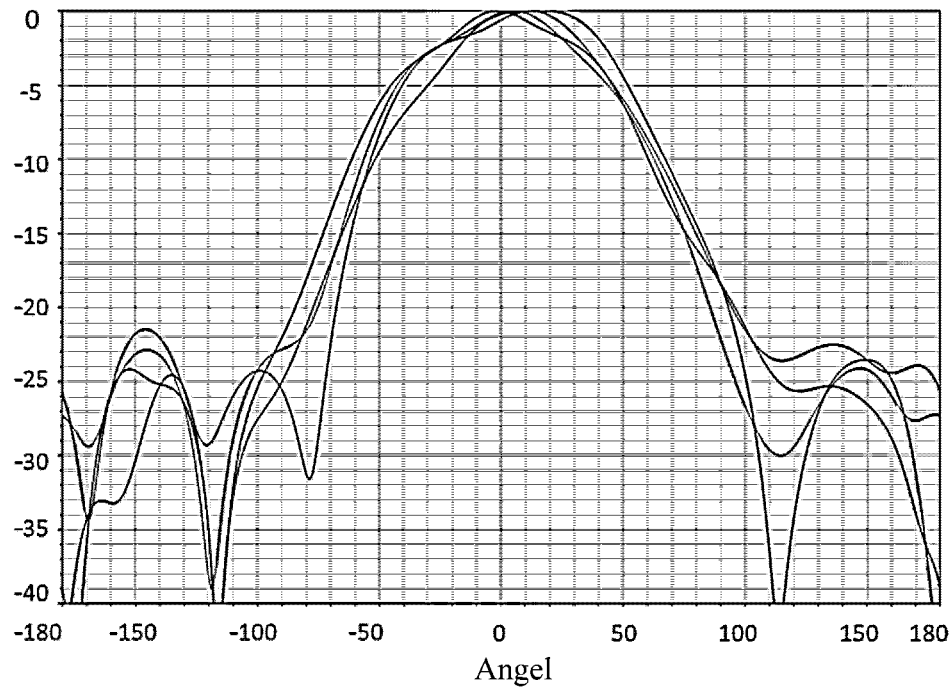
FIG. 11 is a directional pattern of a low-frequency vibrator unit and a high-frequency vibrator unit in the prior art.
Figure 12:
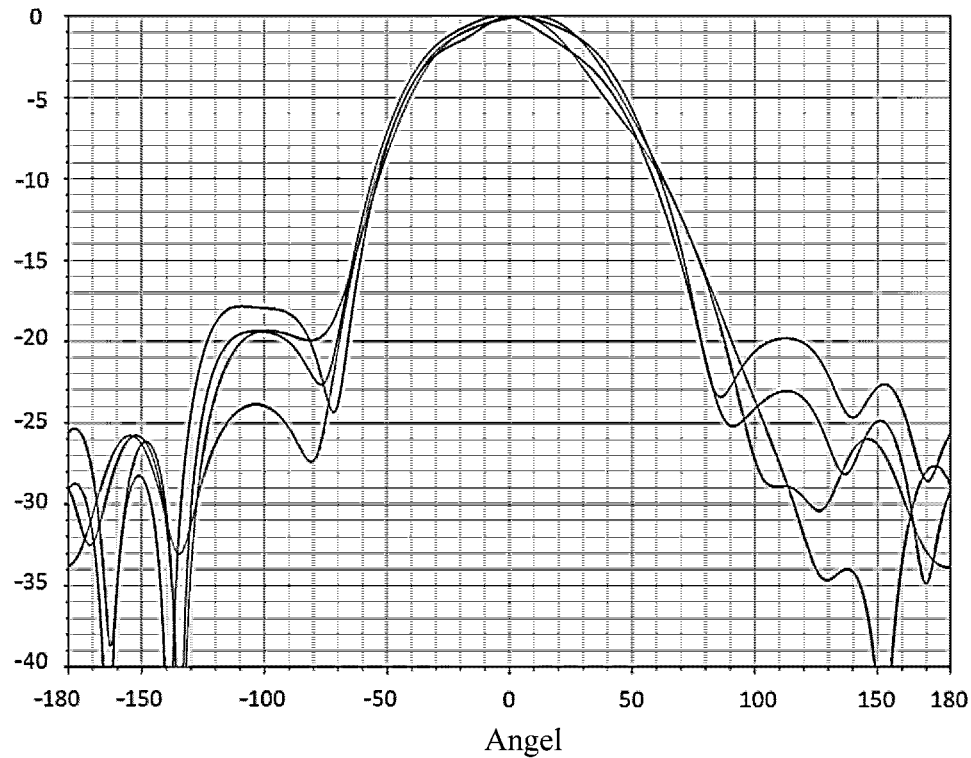
FIG. 12 is a directional pattern of an antenna component according to an embodiment of the present disclosure.

FIG. 11 is a directional pattern of a low-frequency vibrator unit and a high-frequency vibrator unit 5 in the prior art. Correspondingly, FIG. 12 is a directional pattern of an antenna component according to this embodiment. As shown in FIGS. 11 and 12, at a 3 dB bandwidth position (the top position in the middle of the curve in the figure) in the two figures, beams of the antenna component of this embodiment do not distort and converge to 64° to 69°. Therefore, by means of configuration of the low-frequency vibrator unit and the high-frequency vibrator unit 5 in the above embodiment, transceiving performance of the antenna component is improved.

Figure 13:
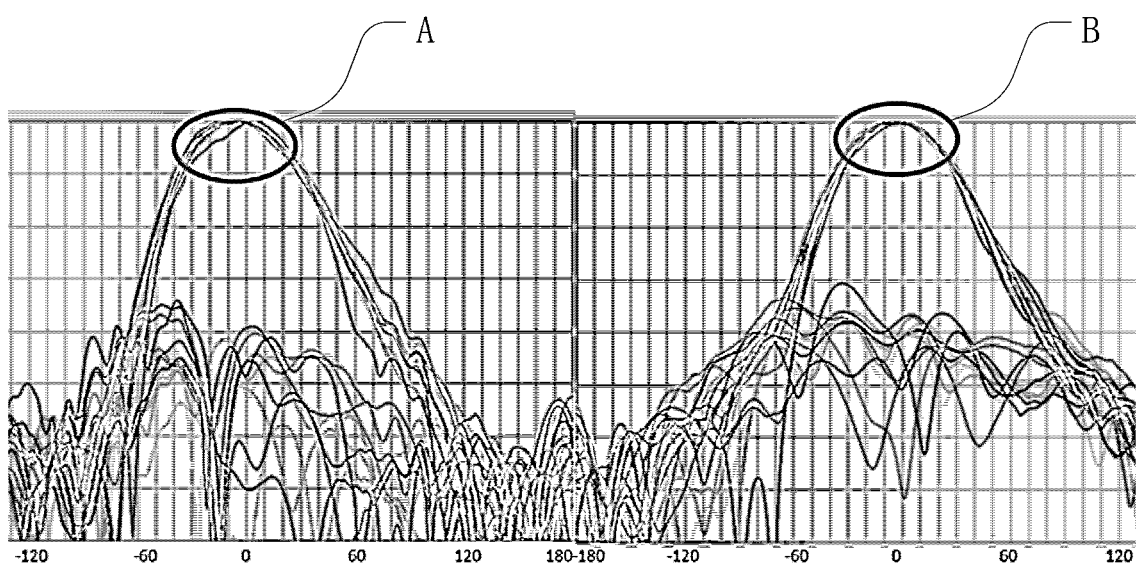
FIG. 13 is a directional comparison pattern of a non-decoupling state of a high-frequency vibrator unit and a decoupling state of a high-frequency vibrator unit according to an embodiment of the present disclosure.
Figure 14:
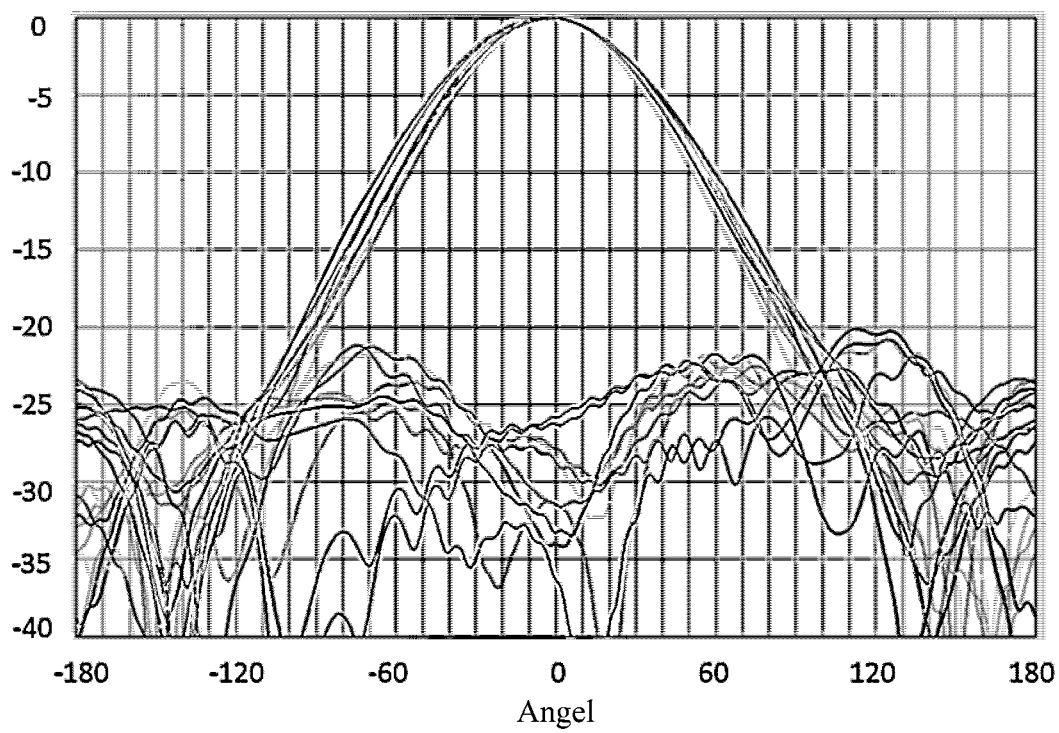
FIG. 14 is a directional pattern of a low-frequency vibrator unit according to an embodiment of the present disclosure.
Figure 15:
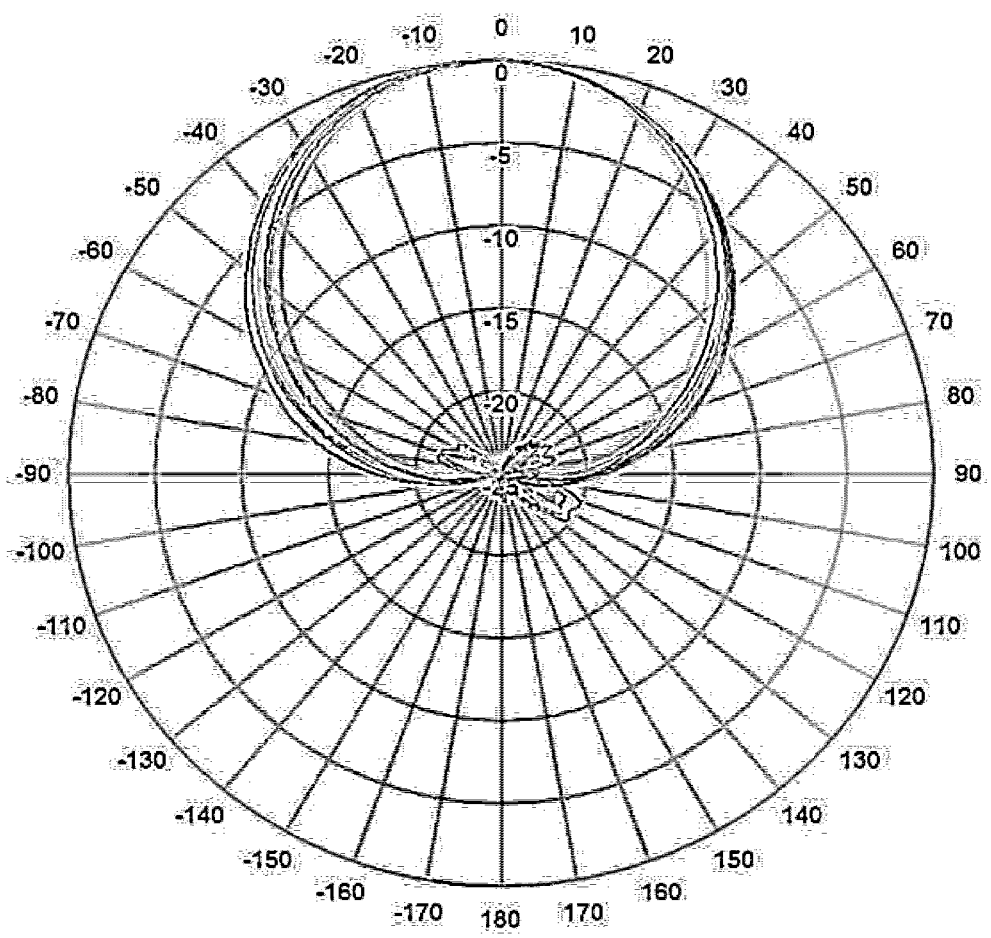
FIG. 15 is a directional gain diagram of a low-frequency vibrator unit according to an embodiment of the present disclosure.

FIG. 13 is a directional comparison pattern of a non-decoupling state (the left figure) of a high-frequency vibrator unit 5 and a decoupling state (the right figure) of a high-frequency vibrator unit 5 according to an embodiment of the present disclosure; As may be seen in the figure, sizes of L1, L2, and L3 on the extension arm are configured, such that a waveform of the high-frequency vibrator unit 5 is more convergent and less distorted (positions A and B in the two figures). Correspondingly, FIGS. 14 and 15 respectively are a directional pattern of a low-frequency vibrator unit and a directional gain diagram of a low-frequency vibrator unit according to an embodiment. After a coupling effect of the high-frequency vibrator unit 5 on the low-frequency vibrator unit is reduced, the directional pattern of the low-frequency vibrator unit converges and does not distort, and the cross-polarization ratio reaches −26 dB.

In another optional implementation, the low-frequency vibrator unit and/or the antenna component in the above embodiment may be applied to a base station. The base station may be configured to receive and transmit a radio signal.

According to the base station of the embodiment, the vibrator arm 1 of the low-frequency vibrator unit is provided to bend towards the bottom, and the director 2 is provided with the window 21 corresponding to the extension branch 11 at the same time. Therefore, in an aspect, the vibrator arm 1 occupies less space, such that more low-frequency vibrator units may be arranged in the same space. In another aspect, the window 21 provided in the director 2 reduces influences thereof on the high-frequency vibrator unit 5 below and improves a cross-polarization ratio of the antenna component, such that signal space directivity and decoupling of the antenna component is stronger. In yet another aspect, the antenna component occupies less space in the base station.

The above description is only the preferred embodiment of the present disclosure and is not intended to limit the present disclosure, and various modifications and changes may be made in the present disclosure for those skilled in the art. Any modification, equivalent replacement, or improvement made within the spirit and principle of the present disclosure should be inclusive in the protection scope of the present disclosure.

We claim:

1. A low-frequency vibrator unit, comprising:
   a plurality of vibrator arms (1) comprising an extension branch (11) and a bending branch (12), wherein the extension branch (11) is oriented towards a peripheral side of the low-frequency vibrator unit, and the bending branch (12) is oriented towards the bottom of the low-frequency vibrator unit; and
   a director (2) provided at the top of the low-frequency vibrator unit and having intervals with the plurality of the vibrator arms (1), wherein the director (2) has a window (21), and at least part of the window (21) corresponds to an orientation of each extension branch (11).

2. The low-frequency vibrator unit according to claim 1, wherein the director (2) further has a directional pattern (22) provided along an edge of the window (21).

3. The low-frequency vibrator unit according to claim 2, wherein the window (21) comprises a plurality of rectangular windows (211), and each rectangular window (211) is provided in a length direction of each extension branch (11); and
   the directional pattern (22) comprises a plurality of directional branches (221), and each directional branch (221) corresponds to each edge of the rectangular window (211).

4. The low-frequency vibrator unit according to claim 3, wherein the window (21) further comprises a center window (212) in communication with the plurality of rectangular windows (211); and
   the two directional branches (221) on opposite sides of the two adjacent rectangular windows (211) are connected to each other, and the total length of the plurality of directional branches (221) is 0.8 λ1 to 1.2 λ1, wherein the λ1 is a wavelength of a center frequency point of a working frequency band of the low-frequency vibrator unit.

5. The low-frequency vibrator unit according to claim 4, wherein the plurality of rectangular windows (211) are four rectangular windows (211) with the same orientation, and the adjacent rectangular windows (211) are vertically arranged to each other; and
   the plurality of directional branches comprise a plurality of first directional branches (2211) and a plurality of second directional branches (2212), the first directional branch (2211) is located on opposite sides of the two adjacent rectangular windows (211), and the second directional branch (2212) is located between the two first directional branch (2211), wherein a length of the first directional branch (2211) is 0.1 λ1, and a length of the second directional branch (2212) is 0.05 λ1.

6. The low-frequency vibrator unit according to claim 1, wherein the extension branch (11) comprises a first rectangular pattern (111), a second rectangular pattern (112), and a third rectangular pattern (113) connected sequentially; and the bending branch (12) comprises a fourth rectangular pattern (121) and a fifth rectangular pattern (122) connected sequentially, wherein the fourth rectangular pattern (121) is connected to the third rectangular pattern (113), and arrangement directions of the fourth rectangular pattern (121) and the fifth rectangular pattern (122) are vertical to an extension direction of the extension branch (11).

7. The low-frequency vibrator unit according to claim 6, wherein a distance between edges of opposite sides of the first rectangular pattern (111) and the third rectangular pattern (113) is 0.05 λ2, a length of a side edge of the third rectangular pattern (113) parallel to the extension direction of the extension branch (11) is 0.13 λ2, and a length of a side edge vertical to the extension direction of the extension branch (11) of the third rectangular pattern (113) is 0.08 λ2, wherein the λ2 is a wavelength of a center frequency point of a working frequency band of a high-frequency vibrator unit.

8. The low-frequency vibrator unit according to claim 6, wherein the third rectangular pattern (113) has a foot point, and the first rectangular pattern (111), the second rectangular pattern (112), the fourth rectangular pattern (121), and the fifth rectangular pattern (122) are arranged along the foot point respectively;

a first distance is from the foot point (1131) to an edge of the first rectangular pattern (111) far from the third rectangular pattern (113), and a second distance is from the foot point (1131) to an edge of the fifth rectangular pattern (122) far from the fourth rectangular pattern (121); and the total length of the first distance and the second distance is 0.25 λ1, wherein the λ1 is a wavelength of a center frequency point of a working frequency band of the low-frequency vibrator unit.

9. The low-frequency vibrator unit according to claim 6, wherein the first rectangular pattern (111) is provided with a connecting hole (13); and/or the third rectangular pattern (113) is provided with a rectangular hole (14) located at a position close to the second rectangular pattern (112).

10. The low-frequency vibrator unit according to claim 1, wherein the low-frequency vibrator unit further comprises:

a balun component (3) comprising a plurality of baluns (31), wherein the two vibrator arms (1) are mounted on two sides of the same balun (31); and a base (4) provided with a plurality of mounting grooves (41) and feeding circuits (42), wherein the balun component (3) is mounted at the base (4) by means of the mounting groove (41) and is electrically connected to the feeding circuit (42).

11. An antenna component, comprising:

a plurality of high-frequency vibrator units;

the low-frequency vibrator unit according to claim 1; and a reflection plate mounted with the high-frequency vibrator unit and the low-frequency vibrator unit at intervals.

12. A base station, comprising:

the antenna component according to claim 11.

* * * * *